Patented Apr. 15, 1924.

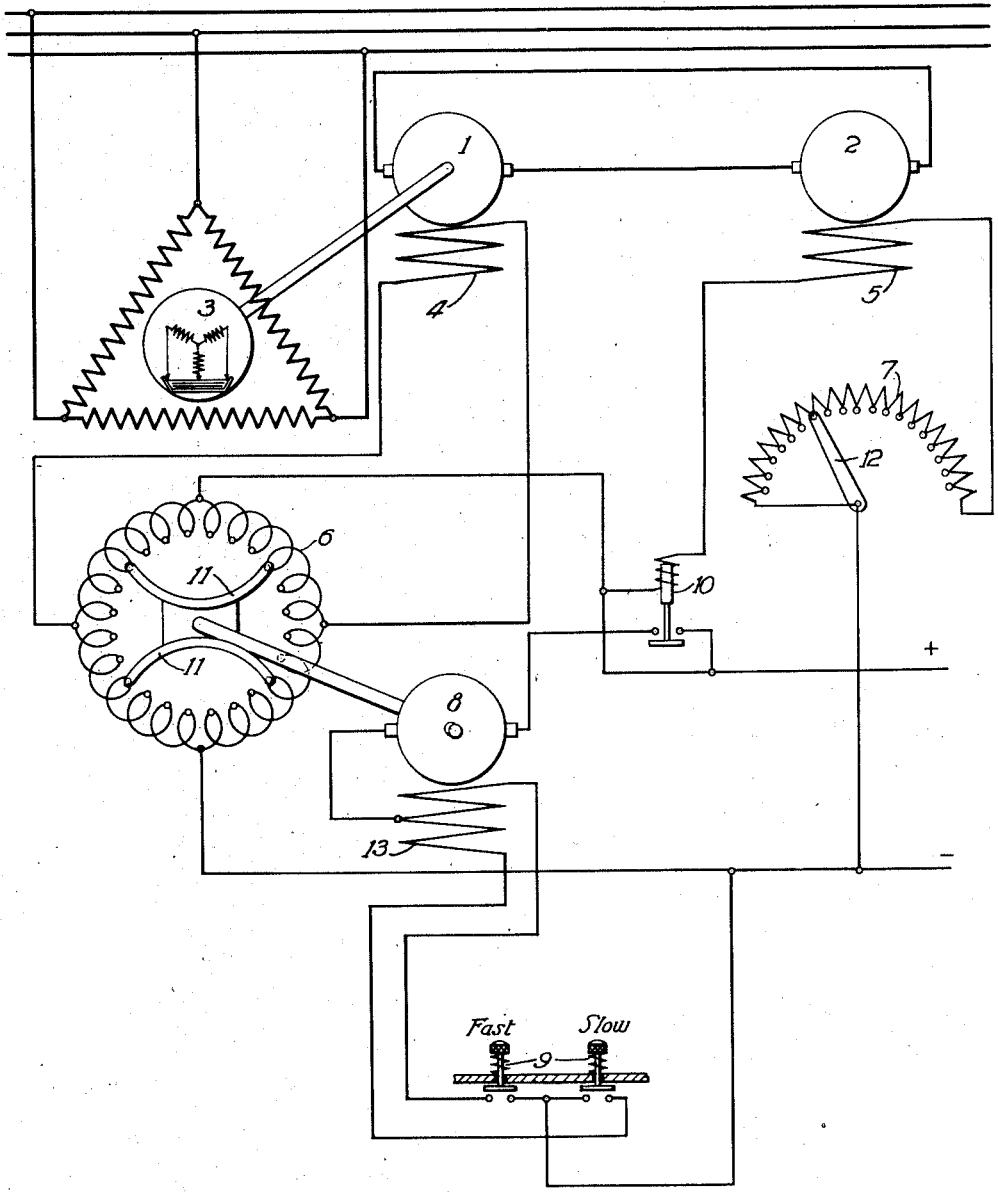

1,490,211

UNITED STATES PATENT OFFICE.

HENRY D. JAMES, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL SYSTEM.

Application filed October 18, 1919. Serial No. 331,543.

*To all whom it may concern:*

Be it known that I, HENRY D. JAMES, a citizen of the United States, and a resident of Edgewood Park, in the county of Allegheny and State of Pennsylvania, have invented a new and useful Improvement in Electrical Systems, of which the following is a specification.

My invention relates to control systems for dynamo-electric machines and particularly to systems for controlling the direction of operation and the speed of electric motors by varying the polarity and excitation of a separately excited generator.

One object of my invention is to provide a system of motor control wherein the field excitation of the motor must reach a predetermined value before the excitation of the generator field can be altered.

A further object of my invention is to provide a system of control in which the inductive lag of the motor-field-winding will be overcome and the motor field current will reach its full value before the generator field current can be changed.

My invention finds special application in connection with motor-generator sets, the armatures of which are connected in series-circuit relation and the field-magnet windings of which are separately excited. In systems of this type, the speed of the motor is first increased to the full value obtainable by increasing the generator voltage. Further acceleration is then obtained by inserting resistance in the circuit of the motor-field-magnet winding. It is essential that this sequence of control be maintained during acceleration and that the corresponding sequence be maintained, in the reverse order, during deceleration.

According to my invention, a motor-generator set is provided with separately excited field-magnet windings, and adjustable rheostats are inserted in the field-magnet winding of each machine. The circuit of the field-magnet winding of the dynamo-electric machine, acting as a motor in this group comprises a relay that is adapted to be closed when the motor field current reaches a maximum value. This relay controls a pilot motor, or other operating mechanism, for varying the resistance in the circuit of the field-magnet winding of the generator.

The single figure of the accompanying drawing is a diagrammatic view of the main and control circuits for a pair of dynamo-electric machines embodying my invention.

The figure of the accompanying drawing shows a generator armature 1 that is connected in closed circuit with a motor armature 2. The generator armature is driven by a prime mover 3 that is here illustrated as an induction motor but which may be any form of engine suitable for driving the generator. Separately excited field-magnet windings 4 and 5 and their corresponding field rheostats 6 and 7 are respectively provided for armatures 1 and 2.

A pilot motor 8 is provided for operating the rheostat 6 and is controlled by push buttons 9 that are respectively designated "Fast" and "Slow." A current relay 10 has an actuating coil in series with the field-magnet winding 5 and is accordingly actuated in accordance with the value of current flowing through the field-magnet winding 5 to partially complete the circuit for the pilot motor, under predetermined conditions to be hereinafter set forth.

The rheostat 6 may be of any type adapted to vary and reverse the current flowing through the field-magnet winding 4. The rheostat here shown is provided with contacting arms 11 that are adapted to be actuated by the pilot motor 8 to insert varying degrees of resistance in the circuit of the field-magnet winding 4.

The rheostat 7, in the circuit of the field-magnet winding 5, may be controlled in any suitable manner. It is here shown in the form of the usual field-circuit resistor in which the position of the arm 12 determines the resistance in the circuit of the motor-field winding.

The current relay 10 is adapted to be actuated to its closed position when the motor-field current reaches substantially its maximum value. This condition obtains when the resistance of the rheostat 7 is substantially cut out. Under normal conditions, the relay 10 interrupts the circuit for the pilot motor 8. It completes this circuit only when substantially a maximum value of field current traverses the field-magnet winding 5.

The push buttons 9, respectively designated "Fast" and "Slow," serve to complete circuits through portions of the pilot-motor-field-magnet winding 13 corresponding to the direction in which it is desired to operate the motor 8.

The motor is started from rest and accelerated by applying full field excitation to the motor and by gradually increasing the voltage applied across the motor armature. The motor field current is brought to a maximum value by moving the arm 12 to such position as to completely shunt the rheostat 7. As soon as the motor field strength builds to its maximum value, the value of the current in the field circuit is such that the relay 10 is actuated to its closed position to partially complete the circuit of the pilot motor 8. It should be pointed out that, unless substantially a maximum field current traverses the winding 5, the relay 10 will not be actuated and, therefore, further acceleration in the motor speed cannot be obtained until the inductive lag of the motor field-magnet winding is overcome and the motor field current attains substantially its maximum value. In view of the fact that the motor field excitation is substantially coincident with the flow of exciting current, the motor field-exciting current will attain its maximum value as soon as the inductive lag of the motor field-magnet winding is overcome. After the current relay 10 has been closed, thereby partially completing the circuit for pilot motor 8, it will remain in this position until further alteration of the motor excitation.

Further acceleration of the motor from this point is obtained by depressing push button 9 marked "Fast", by means of which a circuit is completed through the motor armature 8 and the relay 10 to the exciter circuit. The motor 8, when energized in the above indicated manner, rotates rheostat arms 11 in a direction to remove resistance from the generator field winding circuit and, therefore, to increase the voltage applied to the motor armature 2.

When the generator field winding reaches substantially maximum excitation, the voltage impresed across the motor armature is at its maximum value and further increase of motor speed is obtained by adjustments of the motor field rheostat 7. When the rheostat arm 12 is moved from its short-circuiting position, the relay 10 interrupts the circuit for pilot motor 8, and further change in the generator excitation is prevented until the field excitation of the motor is again brought to maximum degree.

If it is desired to decelerate the motor, the procedure described for accelerating the motor must be followed in the reverse order. In other words, the motor field must first be brought to a maximum value before the generator field can be altered. The generator field excitation is then decreased by depressing the push-button switch designated "slow" to effect adjustment of the rheostat 6 until the desired motor speed is obtained. It is essential that this sequence of operation be maintained. If, during the process of acceleration of the motor, one of the push buttons 9 is depressed and the current of the motor field-magnet winding 5 is less than maximum value, the relay 10 will occupy its open position and, therefore, the circuit for the pilot motor 8 is not completed. Alteration of the field excitation of the generator is thereby prevented unless the motor field excitation is at substantially its maximum value.

The direction of operation of the motor may be reversed by operating the rheostat 6 to reverse the direction of the generator excitation. Further changes in the motor speed are then obtained in the manner hereinbefore described.

It will be apparent that my invention is capable of applications other than those herein described, and I desire, therefore, that only such limitations shall be imposed as are set forth in the appended claims.

I claim as my invention:—

1. A control circuit comprising a pair of separately excited dynamo-electric machines, means for respectively changing the excitation of said machines and a current-responsive relay for delaying the action of the means corresponding to one of said machines until the excitation of the other of said machines reaches a predetermined degree during acceleration and deceleration.

2. A control system comprising a motor, means for varying the excitation thereof, a generator supplying energy to said motor, power-operated means for varying the excitation of said generator, and a single means dependent upon the degree of saturation of said motor for delaying the changes in the excitation of said generator during acceleration and deceleration.

3. A motor-control system comprising a separately excited motor, a separately excited generator supplying the armature of said motor, means for varying and reversing the electromotive force of said generator, and a single relay for delaying the action of said voltage-controlling means during acceleration and deceleration until said motor-field excitation reaches a predetermined value.

4. A motor-control system comprising a separately excited motor, means for varying the field strength thereof, a separately excited generator exclusively supplying energy to said motor, an electroresponsive device for controlling the electromotive force of said generator, and a single current-responsive relay for delaying the action of said device during acceleration and deceleration until the field strength of said motor exceeds a predetermined value.

5. A control system comprising a pair of separately excited dynamo-electric machines, means comprising a pilot-motor for varying and reversing the excitation of one of said machines, means for varying the excitation of the other machine, and means, dependent upon the field-winding conditions of the other of said machines, for delaying the action of said pilot-motor.

6. A control system comprising a motor, a generator for supplying energy thereto, means for varying the excitation of said motor and said generator, and a single means responsive only to the full field current of said motor for permitting changes in the excitation of said generator.

In testimony whereof, I have hereunto subscribed my name this 8th day of Oct. 1919.

HENRY D. JAMES.